United States Patent
Dalmasso

[11] 3,938,879
[45] Feb. 17, 1976

[54] LIQUID CRYSTAL DEVICES
[75] Inventor: Claudio Dalmasso, Ivrea (Turin), Italy
[73] Assignee: Ing. C. Olivetti & C., S.p.A., Ivrea (Turin), Italy
[22] Filed: Nov. 25, 1974
[21] Appl. No.: 527,005

Related U.S. Application Data
[63] Continuation of Ser. No. 272,524, July 17, 1972, abandoned.

[30] Foreign Application Priority Data
Nov. 24, 1971   Italy .................................. 70842/71

[52] U.S. Cl. .......................................... 350/160 LC
[51] Int. Cl.² .......................................... G02F 1/13
[58] Field of Search .......................... 350/160 LC

[56] References Cited
UNITED STATES PATENTS
3,592,526    7/1971   Dreyer ........................ 350/152
3,625,591   12/1971   Freiser ........................ 350/150

*Primary Examiner*—Edward S. Bauer
*Attorney, Agent, or Firm*—I. J. Schaefer

[57]        ABSTRACT

This invention relates to liquid crystal display devices. One aspect of the invention concerns the electrolytic growing of projections on one plate of the device so that the projections register with the tin-oxide segment array on the other plate; another aspect concerns utilizing similar projections as internally placed spacers. An insulative sheet is deposited over the segment array in order to filter D.C. components, according to a third aspect of the invention, and, according to a fourth aspect, a spacing technique is disclosed which utilizes alumina particles in a glass matrix as an edge spacer. Further, a light concentration technique, utilizing a one-way mirror and a prism or fiber optic assembly, is disclosed.

2 Claims, 10 Drawing Figures

LIQUID CRYSTAL DEVICES

CROSS REFERENCE TO RELATED APPLICATION

This is a continuation, of application Ser. No. 272,524 filed July 17, 1972, now abandoned.

The convention priority application for this invention is Italian application No. 70842-A/71 filed on Nov. 24, 1971, in Italy.

BACKGROUND OF THE INVENTION

Liquid crystals have recently found wide application in the display art due to their ability to switch from a transparent to an opaque mode in the presence of electric fields. However, the prior art devices (which will be discussed in detail hereinafter) are subject to a number of substantial disadvantages, among them, poor definition, short life and problems of assembly.

OBJECTS OF THE INVENTION

It is the primary object of this invention to overcome the disadvantages of the prior art liquid crystal devices.

It is a further object of this invention to increase the visual definition of displayed characters.

It is a further object of this invention to provide a display of longer life than currently available.

It is a further object of this invention to provide simple and effect means for precisely spacing the glass plates which are used in liquid crystal displays.

BRIEF DESCRIPTION OF DRAWINGS

FIG. 7b shows a bundle of optical fibers which can be used in the structure of FIG. 7a.

DETAILED DESCRIPTION

Figure 1A:
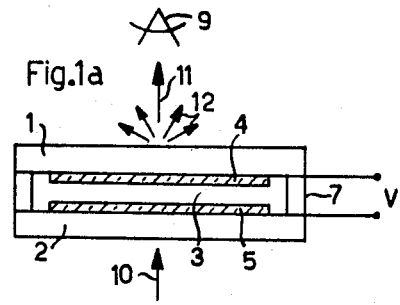
FIG. 1a shows a conventional liquid crystal display used in the transmissive mode.
Figure 1B:
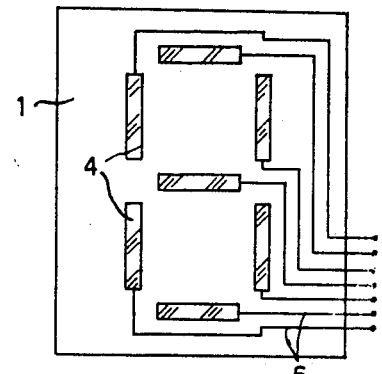
FIG. 1b shows one plate of a conventional liquid crystal display.

FIGS. 1a and b show a typical state of the art liquid crystal display device consisting of two parallel glass plates 1 and 2 having a layer of liquid crystal material 3 sandwiched between. Transparent conductive coatings 4 and 5, which are generally of tin oxide, are deposited over the inner surfaces of the glass plates; on one plate, the conductive coating is applied so as to form the familiar seven segment arrangement as seen in FIG. 1b; on the other plate the coating is applied so as to completely cover the enclosed surface of the glass plate. Electrodes 6 (FIG. 1b) are deposited along with the array 4 and both of the conductive, transparent coatings 4 and 5 are connected to a source of voltage. Polymeric spacers 7 are bonded to the plates with epoxy resin to complete the fabrication.

FIG. 1a shows a liquid crystal display designed or used in the transmissive mode. A ray of light 10 is directed at the side of the display which is opposite the observer 9. Since the glass plates and conductive coatings are transparent, the observer sees light ray 11 which is passed unaltered through the display; the observer sees, therefore, a uniformly bright upper surface. When an electric field is impressed across the array 4 and the sheet 5, the liquid crystal in the path of the field becomes turbulent, causing the incident light ray 10 to be scattered. The scattered light 12 does not reach the observer and, consequently, he sees a rather milky pattern on a light field, which pattern corresponds to the particular segments of array 4 which were energized.

Figure 2:
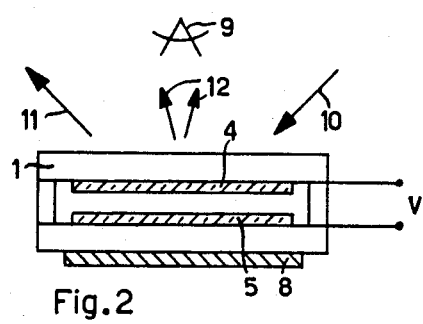
FIG. 2 shows a conventional liquid crystal display used in the reflective mode.

FIG. 2 shows the typical liquid crystal display used in the reflective mode. A reflective sheet 8 is applied to the outer surface of the glass plate 2 which is opposite the observer 9. A ray of incident light 10 is caused to be directed toward the surface of upper plate 1; since the liquid crystal is transparent the light ray 10 is reflected in the normal manner (angle of incidence equaling the angle of reflection) and no light reaches the eye of the observer 9. When a voltage is impressed across the conductive sheet 5 and conductive array 4, the liquid crystal which is subjected to the consequent electric field loses its transparency and causes the incident light ray 10 to be scattered. A portion of the scattered light 12 is directed back to the eye of the observer 9 and he sees a light pattern on a dark field, which pattern corresponds to the particular segments of array 4 which have been energized.

Figure 3:
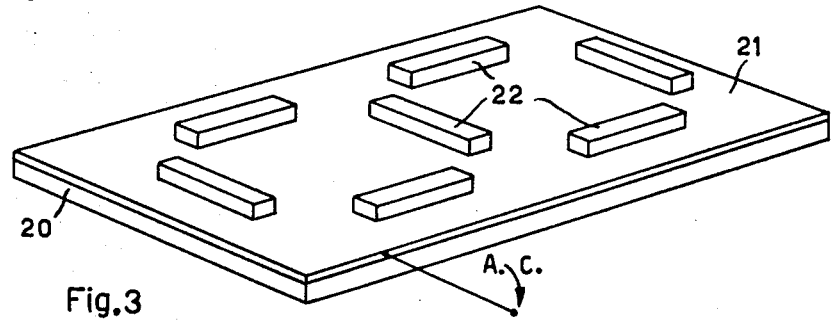
FIG. 3 shows one plate of a display utilizing projections which register with the segment array of the plate opposite.

FIG. 3 shows one of the glass plates of the liquid crystal display constructed in accordance with one aspect of the invention. The other (opposite) plate which contains the aforedescribed seven segment array is not shown. Glass plate 20 is coated with a thin sheet of reflective metal (e.g. aluminum or silver) 21, which sheet is connected to an alternating voltage source A.C. Sheet 21 carries projections 22 which are placed so as to register with the transparent tin oxide seven segment array carried by the upper plate. The metallic sheet serves two purposes: to create, along with the tin oxide array, the electric field through the liquid crystal and to reflect light rays which are incident from above. The plate of FIG. 3 will therefore be used only in the reflective displays generally described in connection with FIG. 2. (A transmissive display can be constructed by substituting tin-oxide for the reflective metal.)

Projections 22 are made by conventional electrolytic growing; that is, sheet 21 is masked with an insulative material over all areas except those where the projections are desired, the plate is then placed in an electrolytic bath (e.g. aluminum or silver), made a cathode, and the projections are grown. By monitoring the total charge transfer, the thickness of the projections can be very accurately controlled. Typically the projections will be 15 microns in thickness with the distance between the upper plate and sheet 21 being 25 microns, thereby making the distance between the upper plate and upper surface of the projections 22 to be 10 microns.

The physics of liquid crystal phenomenon is not entirely understood but it is known that the transparent-opaque switching property is caused by a mechanical resonance of the crystal molecules, which resonance depends on both the thickness of the liquid crystal and the frequency of the excitation voltage. It has been found that, for a given thickness, there is a particular frequency value above which no switching occurs and that as the thickness decreases, the frequency value increases.

The exact frequency above which no switching occurs is highly dependent on the particular liquid crystal utilized and can range from 50 to 5000 c/s. In any event, for the embodiment described above, the cut-off frequency between the upper plate and the projections will be 10 times as great as the cut-off frequency between the upper plate and the unraised areas of the lower plate.

By utilizing the grown projections 22, the turbulence in the liquid crystal can be precisely limited to that crystal which is between the projections and the tin-oxide array. The displayed numbers are consequently more sharply defined than those of a conventional display; in addition, there will be no superfluous glows caused by the electric fields which emanate from the leads 6 connected to the tin-oxide array 4 (FIG. 1b). The glows caused by these leads 6 are quite distracting; in order to limit their effect, the prior art devices require that each display unit (FIG. 1b) be surrounded by a window frame mask which hides the more substantial glows which occur about the edges of each unit. These masks cause a multi-character display to appear as a row of windows, each character being segregated from those adjoining by dark strips of mask. The effect is unsightly and further causes the observer to tend to read individual digits rather than the single multi-digit number. The utilization of the disclosed projections eliminates these masks.

Figure 4:
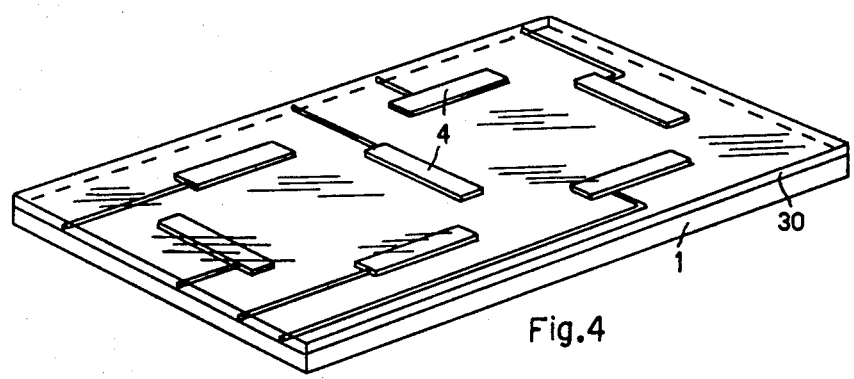
FIG. 4 shows the segment array covered with a film of insulative material.

FIG. 4 shows the tin-oxide seven segment array 4 deposited on glass plate 1 in the conventional fashion. However, deposited over the plate 1 and array 4 is a thin layer of insulative material 30 (e.g. $SiO_2$). (This insulative layer, while shown covering the entire surface of the plate 1, need only cover the segments of the array 4). The insulative layer 30 causes the display to behave as a capacitor; any D.C. currents which are impressed across the liquid crystal gap are blocked, while A.C. current is conducted. The insulative layer 30 filters all D.C. components; since it is the presence of D.C. current components which cause failure in liquid crystal displays, the utilization of the insulative layer 30 enables one to obtain a display which will have a longer life than the conventional devices.

One of the more difficult problems which are encountered in the construction of liquid crystal display is assuring that the glass plates are permanently spaced at a proper distance. The conventional technique, as described in connection with FIG. 1a, is to use polymeric spacers 7 which are affixed to the glass plates with epoxy resin. This technique has a number of rather serious drawbacks, one being that the organic liquid crystal tends to dissolve the organic spacer and resin.

Figure 5:
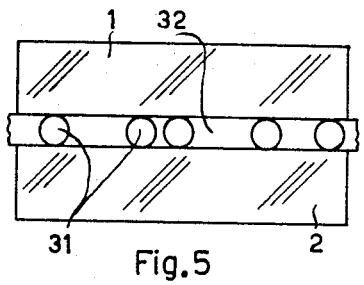
FIG. 5 shows a side view of a display utilizing alumina-glass as an edge spacer.

One solution to the problem is depicted in FIG. 5. FIG. 5 is a highly simplified representation of a liquid crystal display; only glass plates 1 and 2 are shown but it is to be understood that the seven segment array and other elements necessary to a liquid crystal device are properly affixed. About the edges of a glass plate is deposited a mixture of powdered glass and alumina which is conveniently applied by conventional silk screen techniques. Powdered alumina, which consists of grains of highly controlled diameter, is currently commercially available. Alumina grains of 8 to 10 microns in diameter are mixed with powdered glass, the mixture is deposited about the edges of one of the glass plates, the other plate is pressed over the lower plate with the mixture sandwiched between, and the assembly is heated to the melting point of the glass. The alumina particles (which have a higher melting point than glass) form a spacer ridge while the glass, upon resolidification, securely bonds the assembly. FIG. 5 shows alumina grains 31 fixed in glass matrix 32. Should there be a relatively small number of alumina grains which are of overly large diameter, these grains will penetrate the surface of the glass plates since alumina is far harder than glass. The plates will therefore be separated by a proper distance, even in the presence of out-of-tolerance alumina grains in the mixture.

Figure 6A:
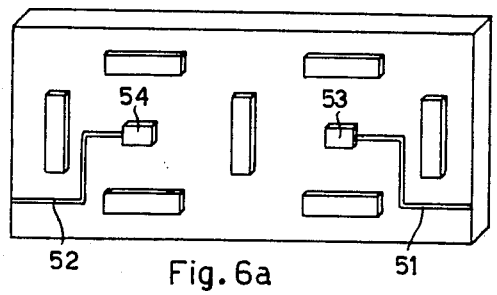
FIG. 6 a and b, shows both plates of a display constructed with internal spacers.
Figure 6B:
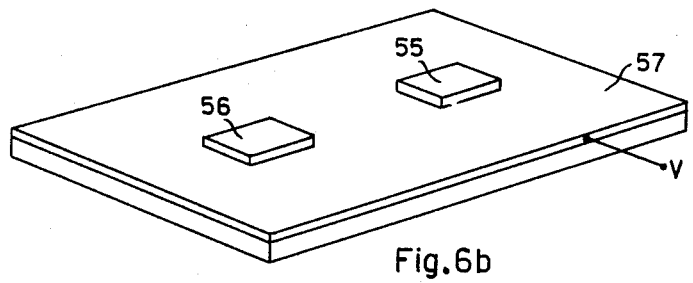

FIG. 6, a and b, depict the upper and lower plates of a liquid crystal display constructed in accordance with another aspect of the invention. The problem of precisely spacing the plates of a liquid crystal device is not completely solved by assuring that the plates are properly separated along their edges - one must also be certain that the central regions of the display are separated by the precise distance required. FIG. 6a shows the upper plate having the seven segment array and further having two deposited conductive regions 51 and 52 with end tabs 53 and 54. These regions and tabs can be of tin-oxide or metal and, if tin-oxide, can be deposited simultaneously with the seven segment arrays. The bottom plate seen in FIG. 6b has two projections 55 and 56 which are electrolytically grown on the metallic sheet 57; these projections are grown in the same fashion as those described in connection with FIG. 3. Projections 55 and 56, however, are grown to a thickness which is equal to the desired spacing between the plates. Tabs 53 and 54 and projections 55 and 56 are so located so that when the plates are placed together, the tabs and projections will make contact. During the assembly process, after the plates are placed together, a small voltage V is connected to the metallic plate 57 while conductive regions 51 and 52 are monitored. If the voltage is conducted to regions 51 and 52, it is known that plates are properly spaced in the internal regions. Should the voltage fail to appear at 51 or 52, it is known that some error has been made and the display must be reassembled or discarded.

The tabs and regions 51–54 are utilized only during the assembly process; once it has been determined that the plates are properly spaced, the tabs and regions are ignored. Projections 55 and 56, however, continue to serve the function of keeping the plates properly spaced; the projections assure that the plates will not be bent toward each other throughout the life of the display.

(A modification of FIG. 6b would be to electrically isolate each projection from sheet 57 by etching paths through the sheet down to the glass plate. Each path would almost surround each projection and would extend to the edge of the plate to form a "key hole" shaped configuration. Each projection together with a thin channel of sheet 57 would be electrically isolated from the rest of the sheet. During display operation, the projections would therefore be unenergized and there would be no danger of superfluous glows. Another modification would be to impress the test voltage on one of the conductive regions (e.g. 51) and monitor the other region 52; by so doing, one would not have to impress any test voltages on the lower plate.)

Figure 7A:
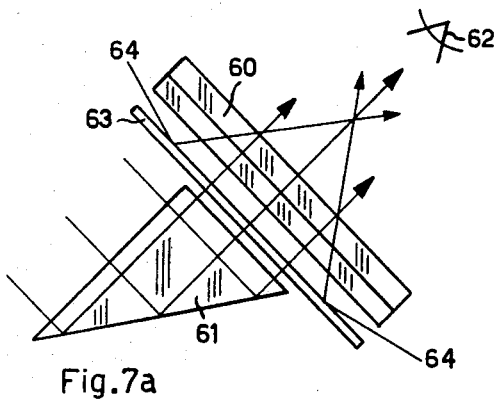
FIG. 7a shows a transmissive display adapted to utilize ambient light.
Figure 7B:
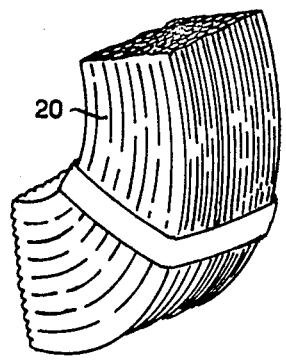

As seen in connection with FIG. 1a, liquid crystal displays can be used in the transmissive mode, that is, with light passing completely through the display before reaching the observer. When used in the transmissive mode, however, it is necessary to place an artificial light source behind the display in order to obtain adequate light passage. FIG. 7a shows a technique whereby the liquid crystal display 60 can be used in the transmissive mode using only ambient light. Placed behind the display is a prism 61 (which can be a conventional rectangular type) positioned so that light passing through the prism is concentrated about the seven segment array (not shown) of the display 60. Instead of prism 61, a bundle of optical fibers 70 can be used (see FIG. 7b).

Display 60 is usually read at an angle of about 45°, that is, the conventional, comfortable angle at which an observer 62 would read any document. At this angle, the back of the display is directed at the lower portions of the room where the ambient light is weakest. By placing prism 61 behind the display, the stronger ambient light from the upper portions of the room is utilized; furthermore, the prism can be selected to give any desired degree of light concentration.

In addition to prism 61 or optical fibers 70 (FIG. 7b), a "one-way mirror" 63 is placed behind the display. The one-way mirror 63 is of conventional construction (that is, a vacuum deposition of metal or sequence of insulators on glass). Mirror 63 allows the prism concentrated light to pass to the display and, further, reflects the ambient light 64 through the display. The reflected ambient light 64 is relatively intense since it emanates from the upper portions of the room.

While the various inventive concepts disclosed have been described in connection with numerical display devices, it must be clear that the invention is not to be limited to these particular devices; the inventions can obviously be used in many liquid crystal applications.

In order that they be more easily understood, the various aspects of the invention were described separately; however, it is clear that two or more of these aspects can be incorporated in a single device, depending upon the designers' specific requirements.

What is claimed is:

1. In a device having two parallel members adapted to contain liquid crystal material therebetween and spacer means for spacing said members from each other a given distance and attaching same to each other, wherein the improvement comprises:

said spacer means comprising alumina particles in a glass matrix and disposed proximate to the edges of said members with the diameter of the particles equal to said given distance and wherein the glass matrix is in a molten state during the assembly of said device and solidifies attaching said members to each other with said members spaced apart said given distance by said particles.

2. In a device according to claim 1, wherein said spacing means further comprises a conductive projection centrally situated on the first of said members and having a thickness equal to said given instance, and a conductive area centrally situated on said second member and contacting said projection, whereby the central area of the two members are spaced apart an equal distance to that of the edges and the passage of a voltage from said conductive projection to said conductive area during the assembly assures that said conductive projection contacts said conductive area.

* * * * *

UNITED STATES PATENT OFFICE
CERTIFICATE OF CORRECTION

PATENT NO. : 3,938,879

DATED : February 17, 1976

INVENTOR(S) : Claudio Dalmasso

It is certified that error appears in the above-identified patent and that said Letters Patent are hereby corrected as shown below:

In Claim 1, column 6 line 24 delete "instance" and insert --distance--.

Signed and Sealed this eighth Day of June 1976

[SEAL]

Attest:

RUTH C. MASON
Attesting Officer

C. MARSHALL DANN
Commissioner of Patents and Trademarks